United States Patent [19]
Holley

[11] Patent Number: 5,491,013
[45] Date of Patent: Feb. 13, 1996

[54] STATIC-DISSIPATING ADHESIVE TAPE

[75] Inventor: Leonard Holley, Edgemon, S.C.

[73] Assignee: Rexam Industries Corp., Matthews, N.C.

[21] Appl. No.: 299,236

[22] Filed: Aug. 31, 1994

[51] Int. Cl.$^6$ .............................. C01B 33/26; C09J 7/02
[52] U.S. Cl. .................. 428/40; 206/714; 206/719; 428/41; 428/354; 428/355; 428/328; 428/480; 428/412; 428/473.5; 428/474.4; 428/521; 428/522; 428/523; 428/330; 428/702; 428/906; 428/918; 428/922
[58] Field of Search ................................ 428/40, 41, 343, 428/352, 354, 355, 906, 918, 922, 324, 328, 480, 473.5, 412, 474.4, 521, 522, 523, 702, 330; 206/328

[56] References Cited

U.S. PATENT DOCUMENTS

| | | | |
|---|---|---|---|
| Re. 28,606 | 11/1975 | Ikeda et al. | 428/155 |
| 3,738,904 | 6/1973 | Ikeda et al. | 161/117 |
| 3,881,988 | 5/1975 | Yasuda | 162/181 A |
| 4,047,232 | 9/1977 | Hisagen et al. | 360/134 |
| 4,154,344 | 5/1979 | Yenni, Jr. et al. | 206/524.6 |
| 4,156,751 | 5/1979 | Yenni, Jr. et al. | 428/212 |
| 4,173,480 | 11/1979 | Woodward | 430/536 |
| 4,582,783 | 4/1986 | Nittel et al. | 430/529 |
| 4,632,872 | 12/1986 | Gallagher | 428/350 |
| 4,698,248 | 10/1987 | Gallagher | 428/350 |
| 4,699,830 | 10/1987 | White | 428/35 |
| 4,738,882 | 4/1988 | Rayford et al. | 428/35 |
| 4,746,574 | 5/1988 | Hattori et al. | 428/409 |
| 4,906,494 | 3/1990 | Babinec et al. | 428/35.2 |
| 4,909,901 | 3/1990 | McAllister et al. | 162/125 |
| 4,963,405 | 10/1990 | Yamashita et al. | 428/40 |
| 4,981,544 | 1/1991 | Nordale | 428/244 |
| 5,064,064 | 11/1991 | Itou et al. | 206/330 |
| 5,073,425 | 12/1991 | Dees, Jr. et al. | 428/48 |
| 5,104,779 | 4/1992 | Säverin et al. | 430/527 |
| 5,110,639 | 5/1992 | Akao | 428/35.2 |
| 5,158,818 | 10/1992 | Aurichio | 428/40 |
| 5,180,615 | 1/1993 | Havens | 428/35.2 |
| 5,208,103 | 5/1993 | Miyamoto et al. | 428/354 |

FOREIGN PATENT DOCUMENTS 0211696  2/1987  European Pat. Off. .

Primary Examiner—Nasser Ahmad
Attorney, Agent, or Firm—Bell, Seltzer, Park & Gibson

[57] ABSTRACT

An electrostatic dissipating packaging tape is disclosed that comprises a transparent substrate, a substantially transparent adhesive layer on one surface of the substrate, and a clay coating on the opposite surface of the substrate from the adhesive. The clay is characterized by being able to provide a surface resistivity of $10^{14}$ ohms per square or less when present on a surface in amounts that are low enough to remain transparent, and the clay is present on the substrate surface in an amount sufficient to provide the coating with a surface resistivity of $10^{14}$ ohms per square or less, but less than an amount that would substantially reduce the transparent optical properties of the packaging tape.

17 Claims, 1 Drawing Sheet

STATIC-DISSIPATING ADHESIVE TAPE

FIELD OF THE INVENTION

The present invention relates to adhesive tapes, and in particular relates to a static-dissipating adhesive tape that incorporates a conductive clay coating.

BACKGROUND OF THE INVENTION

Static electricity is the phenomenon of electric charge at rest, and is generally produced by friction or electrostatic induction.

The buildup of static electricity occurs through a process in which charge transfer takes place between dissimilar materials, at least one of which has a high electrical resistivity. Static electricity often occurs due to rubbing or mere contact between these materials. Such contact and separation of materials occurs during a number of industrial and manufacturing operations, including powder processing, and the manufacture of plastic and other materials in certain forms, particularly sheets.

In some circumstances, the buildup of static electricity can produce a significant physical danger. For example, highly insulating synthetic materials such as polymeric powders and insulating liquids tend to charge up readily and large quantities of electrical energy can accumulate. Such large static charges produce a significant risk of incendiary discharge. Under certain circumstances, and depending upon the material being handled, powerful explosions can result. As a specific example, strict grounding procedures are followed during the refueling of aircraft, ships and other large vehicles because of the risk presented by static electricity.

In other industries, static electricity does not provide a risk of significant physical danger, but instead, small amounts of static electricity can damage sensitive parts. For example, in the microelectronics industry, relatively low energy static discharges can damage microelectronic systems or corrupt data maintained on magnetic media.

As another example, when films of insulating material are wound over rollers, such as in the photography industry, surface charging and subsequent discharging can occur and can produce reactions in the photographic emulsion that can damage the film and render it unmarketable.

Accordingly, in industries that handle materials that are sensitive to even small static discharges, precautions must be taken to avoid the detrimental effects the discharges cause. Because as noted above, static electricity tends to build up when certain insulating materials contact one another, one solution is to manufacture as many containers and handling devices as possible out of conductive materials, or to modify contacting surfaces in some fashion which renders them conductive enough to reduce or eliminate static electricity and its accompanying problems.

All static protective materials are by definition conductive to some extent. In order to classify the relative conductivity of widely differing materials in useful fashion, however, the terms "antistatic" and "static-dissipating" (or "electrostatic dissipating" or "dissipative") are also used. For example, the U.S. Department of Defense identifies conductive materials as those with a surface resistivity of $10^5$ ohms/square or less, static-dissipating materials as those with a surface resistivity of between $10^5$ and $10^9$ ohms/square, and antistatic materials as having a surface resistivity of between $10^9$ and $10^{14}$ ohms/square (DOD-HDBK-263).

The Electronics Industries Association offers a somewhat different scheme (EIA Standard RS-541) and categorizes materials in only two ranges. Conductive materials are defined as those having a surface resistivity of less than $10^5$ ohms/square or a volume resistivity of less than $10^4$ ohms-cm. The EIA defines static-dissipative materials as having either a surface resistivity from $10^5$ ohms/square to $10^{12}$ ohms/square, or a volume resistivity from $10^4$ ohms-cm to $10^{11}$ ohms-cm.

Finally, the International Electrotechnical Commission (IEC) in its publication 801-2 defines antistatic materials as those with a surface resistivity between $10^5$ and $10^{11}$ ohms/square.

Accordingly, it will be understood that as used herein and in the industry, terms such as "antistatic," "static-dissipating," and "conductive" are used somewhat interchangeably and represent descriptive classifications rather than absolute or limiting ones.

One method of rendering objects conductive is to coat their surfaces with materials having conductive properties. There are a number of compounds available for such applications. One common group of materials are the quaternary ammonium salts. As well known to those of ordinary skill in this art, however, the conductivity of quaternary ammonium salts is highly dependent upon relative humidity and the salts tend to lose conductivity at low relative humidities. There are, however, a wide range of antistatic compositions available that fall within the broad definition of quaternary ammonium salts.

Another category of antistatic compositions are the derivatives of fatty acids; i.e. carboxylic acids with long hydrocarbon chains. Although useful for antistatic coatings or additives in some situations, the fatty nature and derivation of these compounds makes them unsuitable for many other applications.

Highly conductive materials such as metals or carbon black also provide good static-dissipating properties, but can cause color or opacity problems in many situations, particularly where a transparent surface is required.

As noted above, certain industries and products such as microelectronics and photography, can be sensitive to even small static discharges. Accordingly, packaging of such materials, particularly the packaging of microelectronic components, should preferably exhibit antistatic properties. Because adhesive tape is such a common packaging material, a conductive adhesive tape is a quite useful element in many packaging situations, particularly for microelectronic components.

Therefore, the need exists for a conductive adhesive tape that exhibits the properties necessary to avoid static discharge damage to packaged components, and yet which maintains the transparency and adhesive properties that are fundamental requirements for the packaging tape even apart from its conductive or static-dissipating or antistatic properties.

OBJECT AND SUMMARY OF THE INVENTION

Therefore, it is an object of the present invention to provide an electrostatic dissipating packaging tape that addresses all of the structural and electronic requirements for such a tape more successfully than do tapes available to date.

The invention meets this object with an electrostatic dissipating packaging tape that comprises a transparent substrate, a transparent adhesive layer on one surface of the substrate, and a transparent clay coating on the opposite surface of the substrate from the adhesive. The clay is characterized as being able to provide a surface resistivity of $10^{14}$ ohms per square or less when present on a surface in amounts that are low enough to remain transparent, and the clay is specifically present on the substrate surface of the electrostatic dissipating packaging tape in an amount sufficient to provide the coating with a surface resistivity of $10^{14}$ ohms per square or less, but in less than an amount that would substantially reduce the transparent optical properties of the packaging tape.

The foregoing and other objects, advantages and features of the invention, and the manner in which the same are accomplished, will become more readily apparent upon consideration of the following detailed description of the invention taken in conjunction with the accompanying drawings, which illustrate preferred and exemplary embodiments, and wherein:

DETAILED DESCRIPTION

Figure 1:
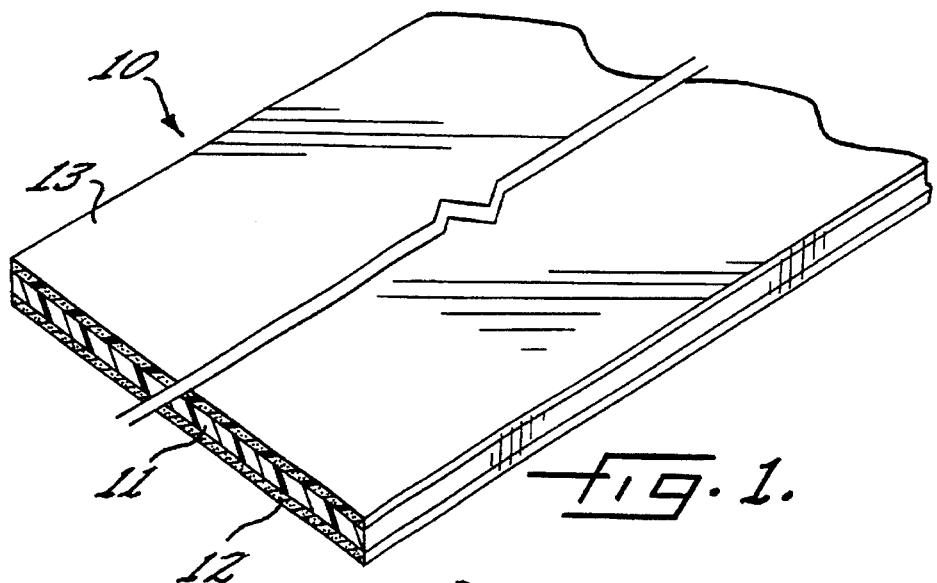
FIG. 1 is a partially perspective cross-sectional view of a static-dissipating adhesive tape according to the present invention.
Figure 2:
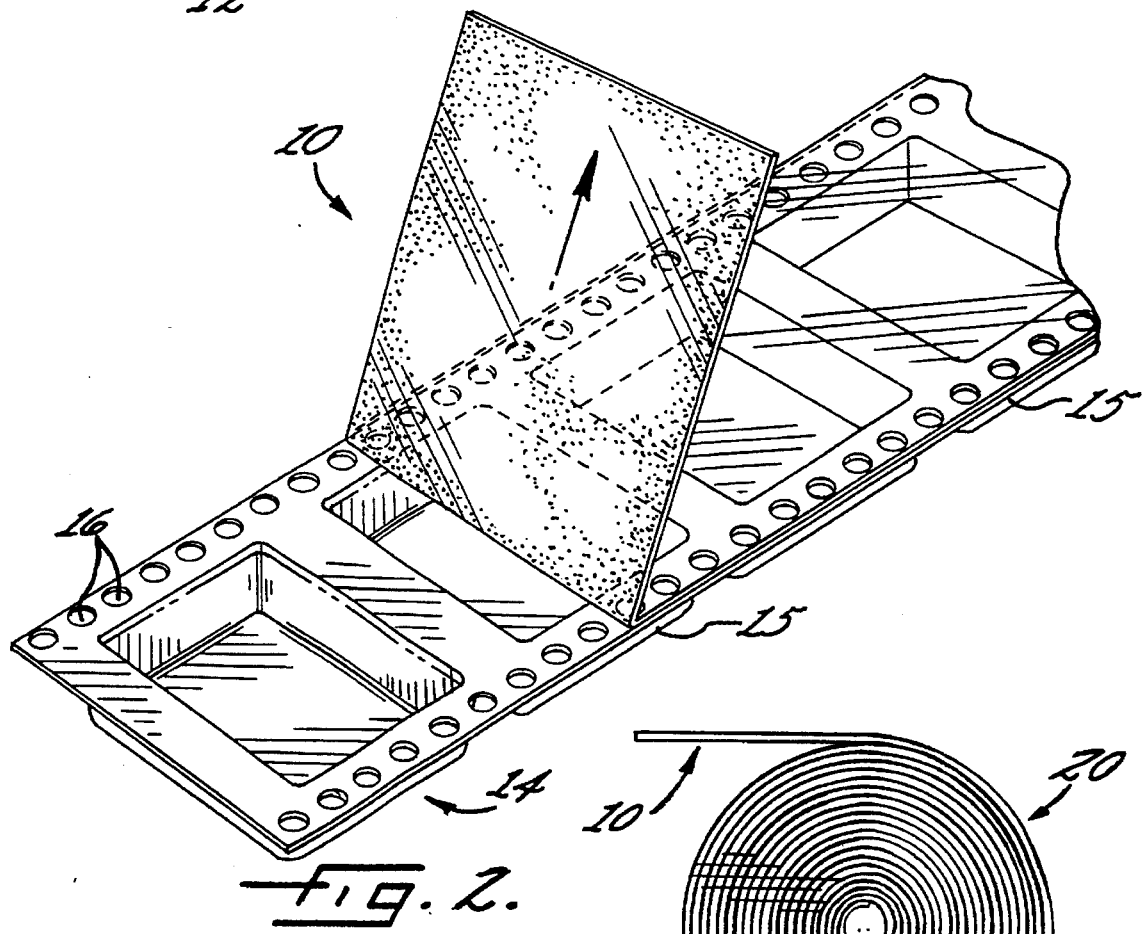
FIG. 2 is a perspective view of one application of such an adhesive tape.
Figure 3:
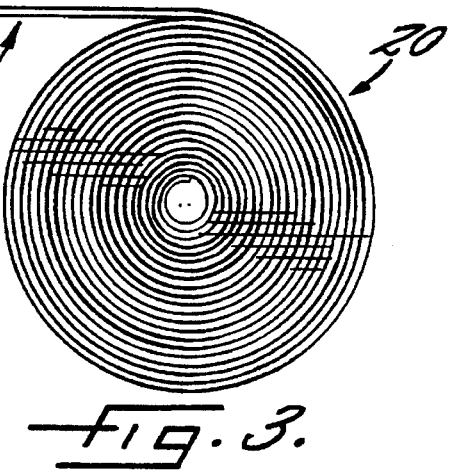
FIG. 3 is a perspective view of a roll of such tape in a form in which it can be dispensed for eventual use.

The present invention is an electrostatic dissipating packaging tape that is broadly designated at 10 in FIGS. 1, 2 and 3. The tape 10 comprises a transparent substrate 11, a substantially transparent adhesive layer 12 on one surface of the substrate 11, and a clay coating 13 on the opposite surface of the substrate 11 from the adhesive 12.

The transparent substrate 11 preferably comprises a polymer sheet, and the polymer can be selected from any number of suitable polymers that are transparent in sheet form. Such a selection can be made by those of ordinary skill in the polymer or tape arts without undue experimentation, but by way of example and not of limitation, such polymers can include polyester, polyethylene, polypropylene, other polyolefins, polycarbonate, nylon (polyamide), polystyrene, cellulose acetate, polyimide, ethylene acrylic acid copolymer, and copolymers and blends of these polymers. In many circumstances, polyester is preferred because of its combination of optical properties, well understood methods of manufacture, and relatively low cost.

Additionally, the substrate surface may be enhanced by common adhesion-promoting treatments known to those of ordinary skill in this art, and which can be carried out without undue experimentation. These include corona discharge, plasma treatments, or some of the chemical coatings commonly supplied on polyester films.

Similarly, an adhesive can be selected by those of ordinary skill in this art without undue experimentation, but again by way of example and not by limitation, such an adhesive can be selected from the group consisting of urethanes, acrylics, latexes, hot melt adhesives such as ethylene vinyl acetate, resin solvent systems such as styrene-solvent systems, rubber-based adhesives, thermoplastic resins, and thermoplastic resins.

As will be explained further herein, the adhesive used in the invention preferably further includes an antiblock agent. The term "block" refers to the undesirable cohesion of films or layers of plastic to one another or to other surfaces. Typical antiblock agents can be selected from the group consisting of finely-divided solid particles and high melting waxes. Antiblock agents are typically added to plastic mixes to prevent adhesion of the surfaces of films made from the plastic to each other or to other surfaces. The particles tend to roughen the surface and maintain a small airspace between adjacent layers, thus preventing adhesion, even where a specific adhesive is used, as in the present invention. Silicate materials are widely used as antiblock agents, while a different type of antiblock function can be obtained from high melting waxes which tend to bloom to the surface of a plastic object and form a layer that is harder than the plastic.

The clay coating 13 on the opposite surface of the substrate 11 is formed of a clay that can be characterized by its capability to provide a surface resistivity of $10^{14}$ ohms per square or less when present on a surface in amounts that are low enough (i.e. or layers thin enough) to remain transparent. Once such a clay is identified, it is present on the substrate surface 11 in an amount sufficient to provide the surface with a surface resistivity of $10^{14}$ ohms per square or less, and preferably $10^9$ ohms per square or less, but less than an amount that would substantially reduce the transparent optical properties of the packaging tape.

The surface resistivity can be measured by appropriate techniques familiar to those of ordinary skill in this art, and without undue experimentation, such as ASTM D257 or ASTM D257-76.

The term "clay" is generally used to refer to the finest-grain particles in a sediment, soil, or rock. For example, a clay particle is generally less than 1/256 of a millimeter in size, while larger particles are referred to as "silt" (1/256– 1/16 mm), sand (1/16–2 mm) and so forth on up to the designation "boulder" which refers to grain sizes of more than 256 millimeters. Clays are also referred to as "commercial clays," or "clay minerals," depending upon their particular chemical makeup.

In the present invention, the preferred clays are sodium lithium magnesium silicate clays, and specifically the synthetic hectorite clays known as "laponite." Laponite clays are hydrous sodium lithium magnesium silicate synthetic smectite-type clays modified with tetrasodium pyrophosphate. The preferred clay is also identified by Chemical Abstract System (CAS) Registration No. 53320-86-8, and has a typical analysis of about 55.5% silicon dioxide ($SiO_2$), 26% magnesium oxide (MgO), 0.8% lithium oxide ($Li_2O$), 5.6% sodium oxide ($Na_2O$), and about 4.1% tetrasodium pyrophosphate, measured as phosphorous pentoxide ($P_2O_5$). Laponite clays are available from several sources, and those as described by the above CAS number can be obtained from Laporte Absorbents, P.O. Box 2, Moorfield Road, Widnes, Cheshire, United Kingdom, or from Southern Clay Products, Inc., 1212 Church Street, Gonzalas, Tex., 78629. The clays are preferably maintained on the film using an appropriate water-based polymer binder such as acrylic, polyurethane, or ethylene vinyl acetate (EVA) polymers.

Laponite can also be described as a synthetic layered silicate or as a hectorite, which is a subgroup of the more common, larger designations of clay such as bentonite and montmorillonite.

The laponite clays incorporated in the present invention hydrate and swell in water to give clear and colorless colloidal dispersions of relatively low viscosity at concentrations of up to about 10%. The sols can be gelled by adding small quantities of electrolytes. In most circumstances, laponite clays are used as thickeners and as flow or rheological additives in personal care products such as toothpaste, shampoo, cosmetics, pharmaceuticals and antiperspirants; in building products such as plasters, glazes and adhesives; in agricultural applications; in paper and polymer films; in household products such as liquid dishwashing detergents, hard-surface cleaners, bleach cleaners, carpet shampoos, liquid soaps, air fresheners and antistatic products; in industrial applications such as catalyst binders, mold release suspensions, grinding pace, ceramics; and in paints or inks, including specialty finishes and clear coats.

The present invention can further comprise a method of forming the electrostatic dissipating tape which comprises applying the substantially transparent adhesive layer to one surface of a transparent polymer substrate, and then applying a dispersion of the clay described herein to the opposite surface of the substrate. The method can comprise the step of mixing an aqueous dispersion of the clay prior to the step of applying the solution to the substrate, and in particular, can comprise mixing the clay with water in an amount of between about 0.2% and 20% by weight of the clay.

The step of applying the dispersion to the substrate preferably comprises applying the dispersion in an amount of between about three and seven pounds per ream, which corresponds to a thickness in the resulting product of between about 0.15 and 0.25 mil (1,000 mil=1 inch). Appropriate coating techniques can be selected by those of ordinary skill in this art, and without undue experimentation.

Similarly, the step of applying the adhesive layer comprises applying the adhesive in an amount of between about two and ten pounds per ream, which corresponds to a thickness of between about 0.15 and 0.50 mils.

In a typical manufacturing process according to the invention, the substrate comprises a relatively large sheet and the method further comprises the steps of drying the clay dispersion and then slitting the sheet into tape strips, both following the step of applying the dispersion to the substrate. The tape strips can then be rolled to form a packaged roll product as described herein.

FIG. 2 shows a typical environmental use of the tape. In FIG. 2, the tape is again broadly designated at 10 and covers a packaging structure broadly designated at 14. The packaging structure 14 is a pocketed tape which includes a plurality of pockets 15, and a series of sprocket holes 16. The pockets 15 are typically used to house electronic components, and as noted above, because these are sensitive to even small amounts of static electricity, the cover tape 10 used to package them should preferably have static-dissipating properties.

FIG. 2 illustrates the packaging tape 14 as having two rows of sprocket holes 16, but it will be understood that some such tapes have only one row of holes, while others have none. The holes 16 in the illustrated tape 14 are suitable for permitting some mechanized or robotic process to advance the tape. It will be well understood and quickly recognized by those familiar with the semiconductor arts, that much of the handling of semiconductor devices such as integrated circuits is carried out robotically or in some similar automated fashion.

FIG. 3 shows another embodiment of the invention in the form of a roll of electrostatic dissipating adhesive tape broadly designated at 20, and with the tape still broadly designated at 10. When in roll form, the substrate remains coated with the substantially transparent layer 13 of the static-dissipating clay composition, and the opposite side is coated with the substantially transparent adhesive layer 12. The clay is characterized as set forth earlier herein, but in the rolled embodiment, the adhesive specifically includes a nonblocking adhesive or an antiblock agent that permits the tape to be unrolled and used without detrimental effect on the antistatic clay composition on the opposite side.

As set forth earlier, the adhesive can be selected by those of ordinary skill in this art without undue experimentation depending upon the nature of the surface to which the tape 10 is expected to be applied, but can be selected from the same exemplary group of adhesives set forth earlier. Similarly, the antiblock agent can again be selected from the group consisting of finely-divided solid particles and high melting waxes. As in the earlier embodiments, the tape substrate 11 is preferably polyester but can also be formed from a number of other similar polymers such as those listed earlier herein. Finally, the clay composition will preferably comprise the sodium lithium magnesium silicate clay described in detail herein.

In the drawings and specification, there have been disclosed typical preferred embodiments of the invention and, although specific terms have been employed, they have been used in a generic and descriptive sense only and not for purposes of limitation, the scope of the invention being set forth in the following claims.

That which is claimed is:

1. An electrostatic dissipating packaging tape comprising:
    a transparent substrate;
    a substantially transparent adhesive layer on one surface of said substrate; and
    a transparent clay coating on the opposite surface of said substrate from said adhesive, said clay coating providing a surface resistivity of less than $10^{14}$ ohms per square and greater than zero when present on said opposite surface in amounts that are low enough to remain transparent; and
    said clay being present in said coating on said substrate surface in an amount sufficient to provide said coating with a surface resistivity of less than $10^{14}$ ohms per square and greater than zero, but less than an amount that would substantially reduce the transparent optical properties of said packaging tape.

2. An electrostatic dissipating packaging tape according to claim 1 wherein said transparent substrate comprises a polymer sheet.

3. An electrostatic dissipating packaging tape according to claim 2 wherein said polymer is selected from the group consisting of: polyester, polyethylene, polypropylene, polycarbonate, nylon, polystyrene, cellulose acetate, polyimide, ethylene acrylic acid copolymer, and copolymers and blends thereof.

4. An electrostatic dissipating packaging tape according to claim 1 wherein said adhesive is selected from the group consisting of: urethanes, acrylics, latexes, ethylene vinyl acetate, styrene-solvent systems, and rubber-based adhesives.

5. An electrostatic dissipating cover tape according to claim 4 wherein said adhesive further comprises an antiblock agent.

6. An electrostatic dissipating cover tape according to claim 5 wherein said antiblock agent is selected from the group consisting of finely divided solid particles and high melting waxes.

7. An electrostatic dissipating packaging tape according to claim 1 wherein said clay comprises a sodium lithium magnesium silicate clay.

8. An electrostatic dissipating packaging tape according to claim 1 wherein said coating has a surface resistivity of $10^9$ ohms per square or less.

9. An electrostatic dissipating tape according to claim 1 wherein said clay coating further comprises a water-based polymer binder selected from the group consisting of acrylic, polyurethane, and ethylene vinyl acetate polymers.

10. A roll of electrostatic dissipating adhesive tape, said roll comprising:

a roll of a transparent polymer substrate in which one side of said substrate is coated with a substantially transparent layer of a static dissipating clay composition and the opposite side is coated with a substantially transparent adhesive layer;

said transparent clay layer providing a surface resistivity of less than $10^{14}$ ohms per square and greater than zero on said substrate surface in amounts that are low enough to remain transparent, and said clay being present in said layer on said substrate surface in an amount sufficient to provide said clay layer with a surface resistivity of less than $10^{14}$ ohms per square and greater than zero, but less than an amount that would substantially reduce the transparent optical properties of said packaging tape; and said adhesive comprising a substantially non-blocking adhesive present on said substrate in an amount that will permit the tape to be unrolled from itself without removing the antistatic composition.

11. A roll of electrostatic dissipating adhesive tape according to claim 10 wherein said non-blocking adhesive is a combination of:

an adhesive selected from the group consisting of urethanes, acrylics, latexes, ethylene vinyl acetate, styrene-solvent systems, and rubber-based adhesives; and an antiblock agent selected from the group consisting of finely divided solid particles and high melting waxes.

12. A roll of electrostatic dissipating adhesive tape according to claim 10 wherein said polymer is selected from the group consisting of: polyester, polyethylene, polypropylene, polycarbonate, nylon, polystyrene, cellulose acetate, polyimide, ethylene acrylic acid copolymer, and copolymers and blends thereof.

13. A roll of electrostatic dissipating adhesive tape according to claim 10 wherein said clay comprises a sodium lithium magnesium silicate clay.

14. A roll of electrostatic dissipating adhesive tape according to claim 10 wherein said coating has a surface resistivity of $10^9$ ohms per square or less.

15. A roll of electrostatic dissipating adhesive tape according to claim 10 wherein said transparent clay layer further comprises a water-based polymer binder selected from the group consisting of acrylic, polyurethane, and ethylene vinyl acetate polymers.

16. An electrostatic dissipating packaging tape according to claim 1 wherein said adhesive is selected from the group consisting of thermoplastic resins, and thermosetting resins.

17. A roll of electrostatic dissipating adhesive tape according to claim 10 wherein said non-blocking adhesive is a combination of:

an adhesive selected from the group consisting of thermoplastic resins, and thermosetting resins; and an antiblock agent selected from the group consisting of finely divided solid particles and high melting waxes.

* * * * *